US010785922B2

(12) United States Patent
Thiele

(10) Patent No.: US 10,785,922 B2
(45) Date of Patent: Sep. 29, 2020

(54) PLANTER APPARATUS

(71) Applicant: Grobo Inc., Waterloo (CA)

(72) Inventor: Christopher Thiele, Waterloo (CA)

(73) Assignee: Grobo Inc., Waterloo, Ontario (CA)

(*) Notice: Subject to any disclaimer, the term of this patent is extended or adjusted under 35 U.S.C. 154(b) by 225 days.

(21) Appl. No.: 15/969,886

(22) Filed: May 3, 2018

(65) Prior Publication Data

US 2018/0325043 A1 Nov. 15, 2018

Related U.S. Application Data

(60) Provisional application No. 62/504,672, filed on May 11, 2017.

(51) Int. Cl.
*A01G 9/20* (2006.01)
*A01G 9/22* (2006.01)
(Continued)

(52) U.S. Cl.
CPC ............. *A01G 9/20* (2013.01); *A01G 9/16* (2013.01); *A01G 9/22* (2013.01); *E06B 9/24* (2013.01); *G02F 1/137* (2013.01); *G02F 1/13306* (2013.01); *G02F 1/163* (2013.01); *A01G 7/045* (2013.01); *E06B 3/6722* (2013.01); *E06B 2009/2464* (2013.01); *G02F 1/1334* (2013.01); *G02F 1/15* (2013.01)

(58) Field of Classification Search
CPC .. E06B 3/6722; E06B 2009/2464; E06B 9/24; A01G 9/22; A01G 9/20; A01G 7/045
USPC ...................................... 47/69, 20.1
See application file for complete search history.

(56) References Cited

U.S. PATENT DOCUMENTS 8,270,059 B2 * 9/2012 Friedman ................ C03C 17/34
359/273
8,441,707 B2 * 5/2013 Lam ........................ G02B 5/23
359/241

(Continued)

OTHER PUBLICATIONS

Cycloptics Technologies, LLC, "An Explanation of What is Plant Lighting", downloaded from https://www.cycloptics.com, Apr. 18, 2017.

(Continued)

*Primary Examiner* — Magdalena Topolski
*Assistant Examiner* — Katelyn T Truong
(74) *Attorney, Agent, or Firm* — Own Innovation Inc.; James W. Hinton

(57) ABSTRACT

A planter apparatus is disclosed herein. The planter apparatus includes a growth chamber; a transmissivity-reducing window adjustable from a substantially opaque state to a substantially transparent state. The window can include a first transmissivity-reducing layer and a second transmissivity-reducing layer coupled to the first transmissivity-reducing layer, and at least a portion of the growth chamber is viewable through the window when the window is in the substantially transparent state. The planter apparatus includes a transmissivity controller for operating the window between the substantially opaque state and the substantially transparent state. For example, the first transmissivity-reducing layer can include a switching film and the second transmissivity-reducing layer can include a gel filter.

20 Claims, 18 Drawing Sheets

(51) Int. Cl.
  *G02F 1/163* (2006.01)
  *G02F 1/133* (2006.01)
  *E06B 9/24* (2006.01)
  *G02F 1/137* (2006.01)
  *A01G 9/16* (2006.01)
  G02F 1/1334 (2006.01)
  E06B 3/67 (2006.01)
  A01G 7/04 (2006.01)
  G02F 1/15 (2019.01)

(56) References Cited

U.S. PATENT DOCUMENTS

| | | | | |
|---|---|---|---|---|
| 2007/0053053 | A1* | 3/2007 | Moskowitz | E06B 9/24 359/296 |
| 2014/0154769 | A1* | 6/2014 | del Ninno | A01G 7/045 435/170 |
| 2014/0345195 | A1* | 11/2014 | Velate | A01G 7/045 47/58.1 LS |
| 2016/0029574 | A1* | 2/2016 | He | A01G 7/045 700/276 |
| 2017/0254517 | A1* | 9/2017 | Nijkamp | A01G 9/20 |
| 2018/0007845 | A1* | 1/2018 | Martin | A01G 31/047 |
| 2019/0200542 | A1* | 7/2019 | Hall | A01G 7/02 |
| 2019/0227423 | A1* | 7/2019 | Miyoshi | A01G 7/045 |
| 2019/0271500 | A1* | 9/2019 | Lee | G02B 6/0088 |
| 2019/0391419 | A1* | 12/2019 | De Jong | E06B 7/28 |

OTHER PUBLICATIONS

Gigahertz-Optik, "MSC15 Low cost spectral light meter," Gigahertz-Optik, downloaded from https://www.gigahertz-optik.de/en-us/product/msc15 on Apr. 18, 2017.
Glass Apps, "Electrochromic Glass vs. PDLC—Smart Glass Technology Comparison," Glass Apps, Nov. 12, 2013, downloaded form https://www.glass-apps.com/electrochromic-glass@ on May 18, 2017.
J. L. Jacobi, "TV tech terms demystified, part two: Display types and technologies," Tech Hive, Feb. 11, 2015, downloaded from http://www.techhive.com/article/2999888/smart-tv/tv-tech-terms-demystified-part-two-display-types-and-technologies.html on Apr. 18, 2017.
Wikipedia, "Polarizer," downloaded from https://en.wikipedia.org/wiki/Polarizer on Apr. 18, 2017.
Cotech filters, "119—Dark Blue," downloaded from http://www.cotechfilters.com/filters/119-dark-blue/ on Apr. 18, 2017.
Wikipedia, "One-way mirror," downloaded from https://en.wikipedia.org/wiki/One-way_mirror on Mar. 14, 2018.

* cited by examiner

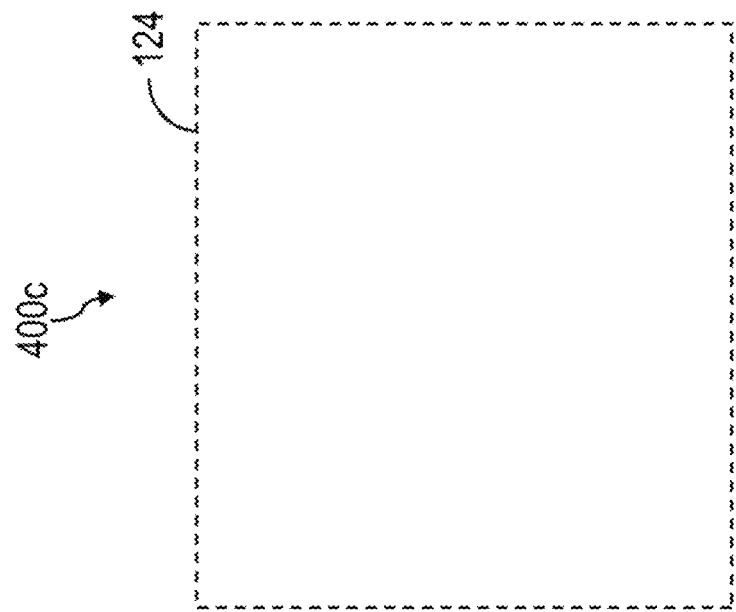
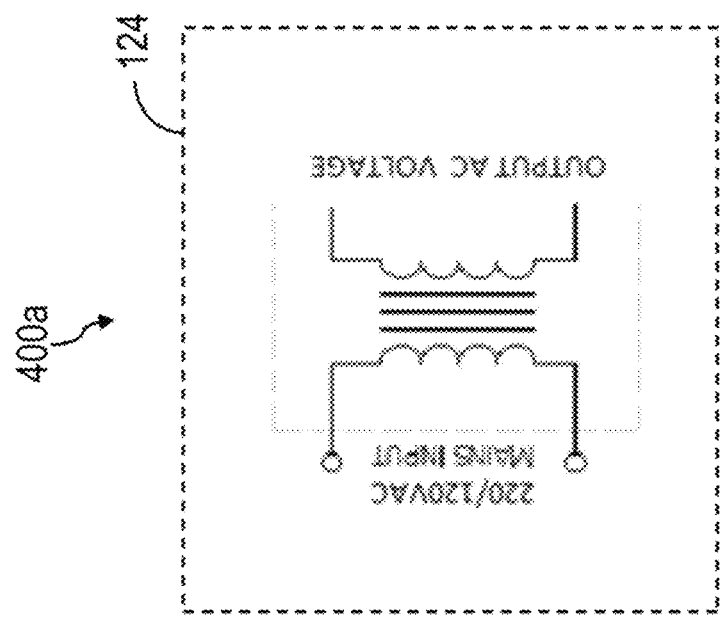
FIG. 4A

| Device | Specific Light Blockage (1~10, 10 Being Complete Blockage) | Overall Light Blockage (1~10, 10 Being Opaque) | Transitioned State Light Allowance (1~10, 10 Being Clear) | Difficulty of Installation (1~10, 10 Being Easy) | Cost (1~5, 5 Being Inexpensive) |
|---|---|---|---|---|---|
| Electrochromic | 4 | 3 | 7 | 4 | 2 |
| PDLC | 7 | 7 | 9 | 8 | 4 |
| Polarized Filters | 10 | 10 | 10 | 1 | 1 |
| Gel Filters | 9 | 7 | 6 | 9 | 5 |
| One Way Mirror | 7 | 7 | 8 | 9 | 4 |

FIG. 5

| Filters | Light Source | Directed T5 Source (µmol/m²/s) | | | R/B LED Strip (µmol/m²/s) | | |
|---|---|---|---|---|---|---|---|
| | Trial # | 0.1m | 0.5m | 1m | 0.1m | 0.5m | 1m |
| No Filters | 1 | 52.250 | 15.500 | 6.592 | 23.240 | 8.025 | 3.753 |
| | 2 | 56.110 | 16.610 | 6.574 | 20.420 | 8.855 | 3.921 |
| | 3 | 56.700 | 17.100 | 6.060 | 21.470 | 8.616 | 3.628 |
| | AVG | 55.020 | 16.403 | 6.409 | 21.710 | 8.499 | 3.767 |
| Red Gel Filter | 1 | 10.420 | 3.292 | 1.539 | 15.430 | 5.609 | 2.921 |
| | 2 | 9.416 | 3.169 | 1.448 | 15.790 | 5.359 | 3.020 |
| | 3 | 9.759 | 3.082 | 1.346 | 15.260 | 5.105 | 3.044 |
| | AVG | 9.865 | 3.181 | 1.444 | 15.493 | 5.358 | 2.995 |
| Green Gel Filter | 1 | 21.680 | 6.977 | 2.978 | 3.522 | 1.299 | 0.714 |
| | 2 | 22.270 | 7.077 | 2.946 | 3.320 | 1.338 | 0.682 |
| | 3 | 23.090 | 7.135 | 2.980 | 3.296 | 1.281 | 0.671 |
| | AVG | 22.347 | 7.063 | 2.968 | 3.379 | 1.306 | 0.689 |
| Blue Gel Filter | 1 | 16.8 | 5.411 | 2.532 | 3.397 | 1.304 | 0.589 |
| | 2 | 17.370 | 5.174 | 3.897 | 3.528 | 1.177 | 0.622 |
| | 3 | 16.760 | 5.132 | 3.890 | 3.617 | 1.285 | 0.608 |
| | AVG | 16.977 | 5.239 | 3.440 | 3.514 | 1.255 | 0.606 |
| Yellow Gel Filter | 1 | 28.630 | 9.569 | 4.119 | 16.590 | 5.594 | 2.969 |
| | 2 | 28.430 | 9.526 | 4.169 | 16.730 | 5.715 | 3.087 |
| | 3 | 28.490 | 9.409 | 4.258 | 16.370 | 5.624 | 3.206 |
| | AVG | 28.517 | 9.501 | 4.182 | 16.563 | 5.644 | 3.087 |
| Blue Switching Film (Opaque) | 1 | 17.890 | 5.051 | 2.043 | 9.723 | 2.124 | 0.711 |
| | 2 | 16.870 | 4.792 | 2.331 | 9.568 | 2.318 | 0.799 |
| | 3 | 18.570 | 4.738 | 2.145 | 9.952 | 2.214 | 0.909 |
| | AVG | 17.777 | 4.860 | 2.173 | 9.748 | 2.219 | 0.806 |

FIG. 7A

| Filters | Light Source | Directed T5 Source ($\mu mol/m^2/s$) | | | R/B LED Strip ($\mu mol/m^2/s$) | | |
|---|---|---|---|---|---|---|---|
| | Trial # | 0.1m | 0.5m | 1m | 0.1m | 0.5m | 1m |
| Grey Switching Film (Opaque) | 1 | 27.910 | 6.657 | 2.731 | 12.310 | 3.540 | 1.664 |
| | 2 | 27.110 | 6.604 | 2.911 | 13.250 | 3.394 | 1.658 |
| | 3 | 25.740 | 6.322 | 2.894 | 13.160 | 3.215 | 2.792 |
| | AVG | 26.920 | 6.528 | 2.845 | 12.913 | 3.383 | 2.038 |
| Black Switching Film (Opaque) | 1 | 13.380 | 4.181 | 1.723 | 5.797 | 2.134 | 1.034 |
| | 2 | 13.880 | 4.076 | 1.685 | 5.722 | 2.222 | 1.064 |
| | 3 | 13.280 | 4.012 | 1.729 | 5.769 | 2.247 | 1.082 |
| | AVG | 13.513 | 4.090 | 1.712 | 5.763 | 2.201 | 1.060 |
| Red Switching Film (Opaque) | 1 | 20.750 | 5.870 | 2.242 | 13.270 | 3.685 | 1.441 |
| | 2 | 21.840 | 5.482 | 2.072 | 16.250 | 3.666 | 1.513 |
| | 3 | 20.590 | 6.560 | 1.993 | 16.250 | 3.575 | 1.694 |
| | AVG | 21.060 | 5.971 | 2.102 | 15.257 | 3.642 | 1.549 |
| Blue Switching Film (Opaque) + Red Gel Filter | 1 | 2.953 | 0.943 | 0.357 | 4.276 | 1.352 | 0.572 |
| | 2 | 3.576 | 0.903 | 0.358 | 4.214 | 1.365 | 0.596 |
| | 3 | 3.523 | 0.888 | 0.383 | 4.173 | 1.325 | 0.572 |
| | AVG | 3.351 | 0.911 | 0.366 | 4.221 | 1.347 | 0.580 |
| Red Switching Film (Opaque) + Blue Gel Filter | 1 | 5.169 | 1.388 | 0.559 | 1.494 | 0.405 | 0.203 |
| | 2 | 5.210 | 1.368 | 0.562 | 1.512 | 0.404 | 0.194 |
| | 3 | 4.309 | 1.378 | 0.575 | 1.504 | 0.409 | 0.210 |
| | AVG | 4.896 | 1.378 | 0.565 | 1.503 | 0.406 | 0.203 |
| Red Gel Filter + Blue Gel Filter | 1 | 0.371 | 0.132 | 0.063 | 0.516 | 0.190 | 0.097 |
| | 2 | 0.381 | 0.130 | 0.052 | 0.507 | 0.190 | 0.093 |
| | 3 | 0.370 | 0.130 | 0.051 | 0.510 | 0.186 | 0.093 |
| | AVG | 0.374 | 0.131 | 0.055 | 0.511 | 0.188 | 0.094 |
| Blue Switching Film (Opaque) + Green Gel Filter | 1 | 10.010 | 2.425 | 0.970 | 1.329 | 0.380 | 0.191 |
| | 2 | 9.303 | 2.423 | 0.975 | 1.278 | 0.385 | 0.185 |
| | 3 | 9.053 | 2.384 | 0.976 | 1.225 | 0.359 | 0.187 |
| | AVG | 9.455 | 2.411 | 0.974 | 1.277 | 0.374 | 0.184 |
| Red Switching Film (Transparent) + Blue Gel Film + One-Way Mirror | 1 | 0.199 | 0.050 | 0.027 | 0.151 | 0.061 | 0.030 |
| | 2 | 0.176 | 0.050 | 0.027 | 0.168 | 0.057 | 0.028 |
| | 3 | 0.202 | 0.051 | 0.027 | 0.156 | 0.056 | 0.029 |
| | AVG | 0.192 | 0.050 | 0.027 | 0.158 | 0.058 | 0.029 |

FIG. 7B

| Filters | Light Sourc | Directed T5 Source (% Reduction) | | | R/B LED Strip (% Reduction) | | |
|---|---|---|---|---|---|---|---|
| | Trial # | 0.1m | 0.5m | 1m | 0.1m | 0.5m | 1m |
| Black Switching Film (Opaque) | Weighted AVG | 74.60% | | | 73.14% | | |
| | RB/T5 AVG | 74.01% | | | | | |
| | . | . | . | . | . | . | . |
| | AVG | 75.44% | 75.07% | 73.26% | 73.46% | 74.10% | 71.86% |
| Red Switching Film (Opaque) | Weighted AVG | 64.17% | | | 48.58% | | |
| | RB/T5 AVG | 57.94% | | | | | |
| | . | . | . | . | . | . | . |
| | AVG | 61.72% | 63.60% | 67.20% | 29.73% | 57.15% | 58.87% |
| Blue Switching Film (Opaque) + Red Gel Filter | Weighted AVG | 94.22% | | | 83.10% | | |
| | RB/T5 AVG | 89.77% | | | | | |
| | . | . | . | . | . | . | . |
| | AVG | 93.91% | 94.45% | 94.29% | 80.56% | 84.15% | 84.60% |
| Red Switching Film (Opaque) + Blue Gel Filter | Weighted AVG | 91.29% | | | 94.31% | | |
| | RB/T5 AVG | 92.50% | | | | | |
| | . | . | . | . | . | . | . |
| | AVG | 91.10% | 91.60% | 91.18% | 93.08% | 95.22% | 94.62% |
| Red Gel Filter + Blue Gel Filter | Weighted AVG | 99.22% | | | 97.64% | | |
| | RB/T5 AVG | 98.59% | | | | | |
| | . | . | . | . | . | . | . |
| | AVG | 99.32% | 99.20% | 99.13% | 97.65% | 97.76% | 97.49% |
| Blue Switching Film (Opaque) + Green Gel Filter | Weighted AVG | 84.31% | | | 94.94% | | |
| | RB/T5 AVG | 88.56% | | | | | |
| | . | . | . | . | . | . | . |
| | AVG | 82.81% | 85.30% | 84.81% | 94.12% | 95.59% | 95.11% |
| Red Switching Film (Transparent) + Blue Gel Film + One-Way Mirror | Weighted AVG | 99.64% | | | 99.27% | | |
| | RB/T5 AVG | 99.49% | | | | | |
| | . | . | . | . | . | . | . |
| | AVG | 99.65% | 99.69% | 99.58% | 99.27% | 99.32% | 99.23% |

FIG. 8B

| Filters | Visibility | | | | B (%) | R (%) | W (%) |
|---|---|---|---|---|---|---|---|
| | 1m | 3m | 5m | AVG | | | |
| No Filters | 5 | 5 | 4 | 4.7 | 50% | 75% | 50% |
| Blue Switching Film (Transparent) | 3 | 5 | 4 | 4.0 | 50% | 75% | 50% |
| | 4 | 5 | 5 | 4.7 | 50% | 100% | 100% |
| Grey Switching Film (Transparent) | 4 | 5 | 4 | 4.3 | 50% | 75% | 50% |
| | 4 | 5 | 4 | 4.3 | 100% | 100% | 100% |
| Red Switching Film (Transparent) | 4 | 4 | 4 | 3.8 | 50% | 75% | 50% |
| | 3 | 5 | 4 | 4.0 | 100% | 0 | 100% |
| Blue Switching Film (Transparent) + Red Gel Filter | 3 | 2 | 1 | 2.0 | 50% | 75% | 50% |
| | 3 | 3 | 2 | 2.7 | 100% | 50% | 100% |
| Red Switching Film (Transparent) + Blue Gel Filter | 3 | 2 | 2 | 2.3 | 50% | 75% | 50% |
| | 3 | 4 | 3 | 3.3 | 0% | 100% | 100% |
| Blue Switching Film (Transparent) + Green Gel Filter | 3 | 2 | 2 | 2.3 | 50% | 75% | 50% |
| | 3 | 3 | 2 | 2.7 | 75% | 100% | 100% |
| Red Switching Film (Transparent) + Blue Gel Film + One-Way Mirror | 2 | 2 | 2 | 2.0 | 50% | 75% | 50% |
| | 3 | 3 | 2 | 2.7 | 0% | 100% | 100% |

FIG. 9

| Filters | Light Source | B/R/W 50/50/75 (umol/m^2/s) | | | B/R/W 0/100/100 (umol/m^2/s) | | |
|---|---|---|---|---|---|---|---|
| | Trial # | 0.1m | 0.5m | 1m | 0.1m | 0.5m | 1m |
| No Filters | 1 | 68.210 | 12.650 | 3.787 | 90.540 | 18.220 | 4.996 |
| | 2 | 66.910 | 12.680 | 3.755 | 82.740 | 18.370 | 5.006 |
| | 3 | 76.530 | 12.980 | 3.655 | 92.420 | 18.630 | 5.069 |
| | AVG | 70.550 | 12.770 | 3.732 | 88.567 | 18.407 | 5.024 |
| Red Switching Film (Transparent) + Blue Gel Film + One-Way Mirror | 1 | 0.364 | 0.069 | 0.021 | 0.283 | 0.056 | 0.020 |
| | 2 | 0.418 | 0.070 | 0.021 | 0.279 | 0.056 | 0.020 |
| | 3 | 0.434 | 0.071 | 0.021 | 0.283 | 0.058 | 0.020 |
| | AVG | 0.405 | 0.070 | 0.021 | 0.282 | 0.057 | 0.020 |

FIG. 14

| Filters | Light Source | B/R/W 50/50/75 (% Reduction) | | | B/R/W 0/100/100 (% Reduction) | | |
|---|---|---|---|---|---|---|---|
| | Trial # | 0.1m | 0.5m | 1m | 0.1m | 0.5m | 1m |
| Red Switching Film (Transparent) + Blue Gel Film + One-Way Mirror | AVG | 99.77% | | | 99.83% | | |
| | Spectrums AVG | 99.79% | | | | | |
| | - | - | - | - | - | - | - |
| | AVG | 99.43% | 99.90% | 99.97% | 99.60% | 99.92% | 99.97% |

FIG. 15

PLANTER APPARATUS

CROSS-REFERENCE TO RELATED PATENT APPLICATIONS

The application claims the benefit of U.S. Provisional Application No. 62/504,672, filed on May 11, 2017. The complete disclosure of U.S. Provisional Application No. 62/504,672 is incorporated herein by reference.

FIELD

The described embodiments relate to a planter apparatus and more specifically, to a planter apparatus with a transmissivity-reducing window.

BACKGROUND

Farm-to-table is an increasingly important socially responsible initiative. Unfortunately, many consumers have limited access to green space and live in areas with weather that is not always conducive to plant growth. Automated indoor planters, or grow boxes, enable consumers to grow their plants in a relatively controllable environment.

The use of an indoor controlled environment for plant growth introduces different challenges. During the growth of the plant, consumers will likely want to observe plant growth from time to time. Exposure to the external environment, however, can have adverse effect on the plant. For example, light from the external environment can have negative effects on the growth cycle of a plant, especially for plants that are more light-sensitive.

SUMMARY

The various embodiments described herein generally relate to planter apparatuses and specifically, to planter apparatuses with a transmissivity-reducing window.

In some embodiments, there is described a planter apparatus that includes: a growth chamber; a transmissivity-reducing window adjustable from a substantially opaque state to a substantially transparent state, wherein the window includes a first transmissivity-reducing layer and a second transmissivity-reducing layer coupled to the first transmissivity-reducing layer, and at least a portion of the growth chamber is viewable through the window when the window is in the substantially transparent state; and a transmissivity controller for operating the window between the substantially opaque state and the substantially transparent state.

In some embodiments, each of the first transmissivity-reducing layer and the second transmissivity-reducing layer includes a switching film.

In some embodiments, the switching film includes one of a red switching film and a blue switching film.

In some embodiments, the first transmissivity-reducing layer includes a switching film and the second transmissivity-reducing layer comprises a gel filter.

In some embodiments, the switching film includes a red switching film or a blue switching film. In some embodiments, the gel filter includes a green gel filter, a blue gel filter or a red gel filter.

In some embodiments, the transmissivity controller generates a control signal to trigger the switching film to enter one of the substantially opaque state and the substantially transparent state. The transmissivity controller can include an AC to AC converter to generate the control signal, or a DC to AC converter to generate the control signal. The control signal can include an alternating current signal in an approximate range from 14 VAC to 60 VAC.

The transmissivity controller can include a series of capacitors connected in parallel to generate the control signal.

In some embodiments, the switching film comprises a material selected from the group consisting of electrochromic glass and polymer dispersed liquid crystals (PDLC).

In some embodiments, there is described a planter apparatus that includes: a growth chamber; and a transmissivity-reducing window that includes a first transmissivity-reducing layer and a second transmissivity-reducing layer coupled to the first transmissivity-reducing layer, and at least a portion of the growth chamber is viewable through the transmissivity-reducing window.

In some embodiments, at least one of the first transmissivity-reducing layer and the second transmissivity-reducing layer includes a gel filter. The gel filter can be a red gel filter or a blue gel filter.

In some embodiments, the transmissivity-reducing window reduces an amount of photosynthetic active radiation from entering the growth chamber.

In some embodiments, the transmissivity-reducing window prevents at least 95% of photosynthetic active radiation from entering the growth chamber.

In some embodiments, the planter apparatus includes an enclosure for enclosing the growth chamber. The enclosure includes a top surface; a bottom surface; and one or more side walls extending from the top surface to the bottom surface. The window can be mounted to a side wall of the one or more side walls. In some embodiments, the window includes a first window and a second window, and the first window is mounted to the side wall and the second window is mounted to the top surface.

The planter apparatus can also include a door for providing access to the growth chamber.

In some embodiments, the first transmissivity-reducing layer can include a switching film and the second transmissivity-reducing layer can include one of a semi-transparent mirror layer and a filtering layer.

In some embodiments, the window includes an exterior layer and an interior layer, the first and second transmissivity-reducing layers being coupled between the exterior layer and the interior layer, the exterior layer including a window layer and the interior layer including a semi-transparent mirror layer.

BRIEF DESCRIPTION OF THE DRAWINGS

Several embodiments will now be described in detail with reference to the drawings, in which:

FIG. 4A is example transmissivity controllers in accordance with several example embodiments;

FIG. 5 is a table of the characteristics of example materials with transmissivity-reducing properties;

FIGS. 7A and 7B are tables of experimental values of a transmissivity of light from different light sources with the use of various transmissivity-reducing materials;

FIGS. 8A and 8B are tables of experimental values of an amount of light reduction with the use of various transmissivity-reducing materials;

FIG. 9 is a table of visibility ratings assigned to various transmissivity-reducing materials under different light environments;

FIG. 14 is a table of experimental values in accordance with another example embodiment; and FIG. 15 is another table of experimental values in accordance with the example embodiment shown in FIG. 14.

Figure 1:
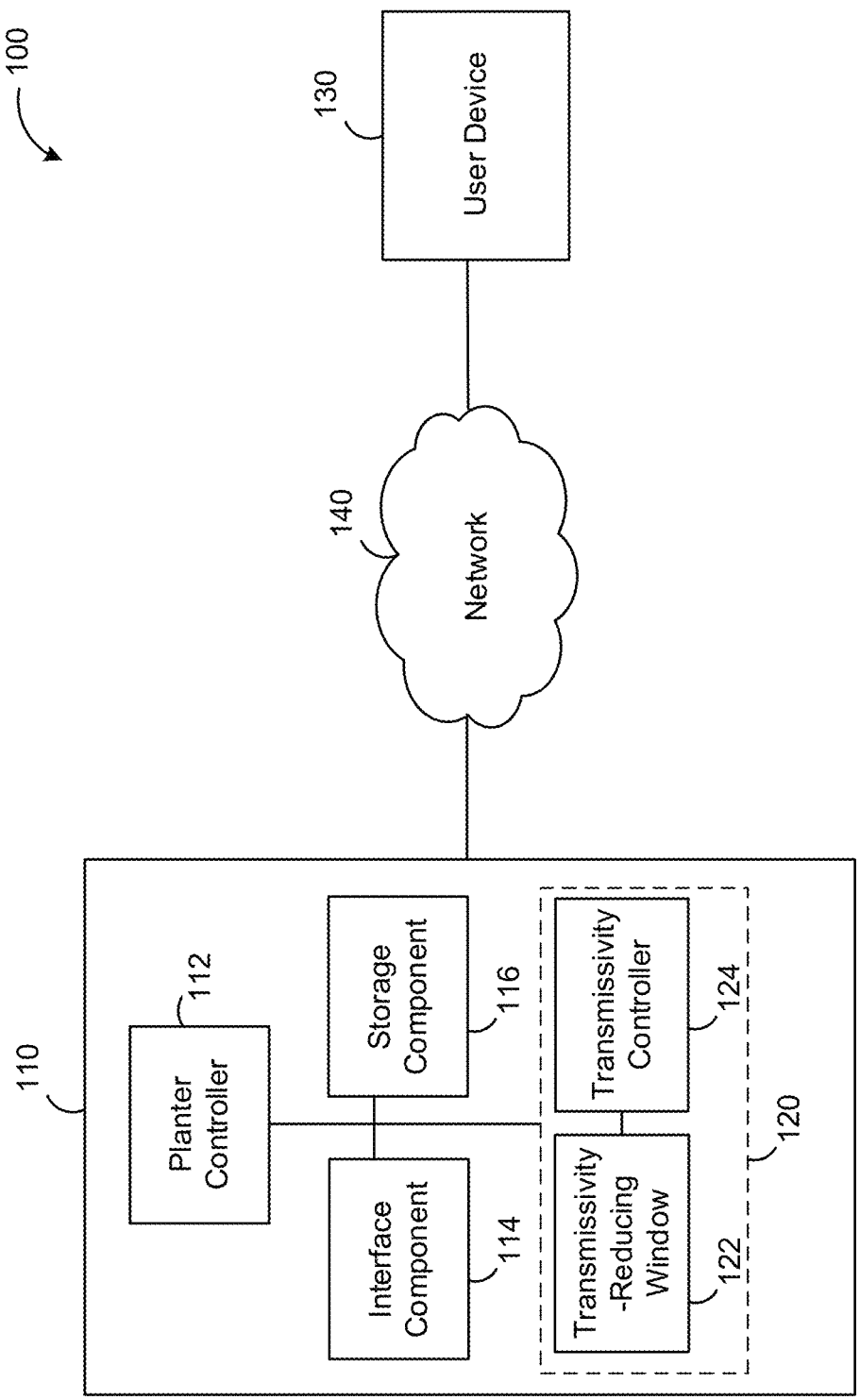
FIG. 1 is a block diagram of components interacting with an example planter apparatus in accordance with an example embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXAMPLE EMBODIMENTS

Figure 2B:
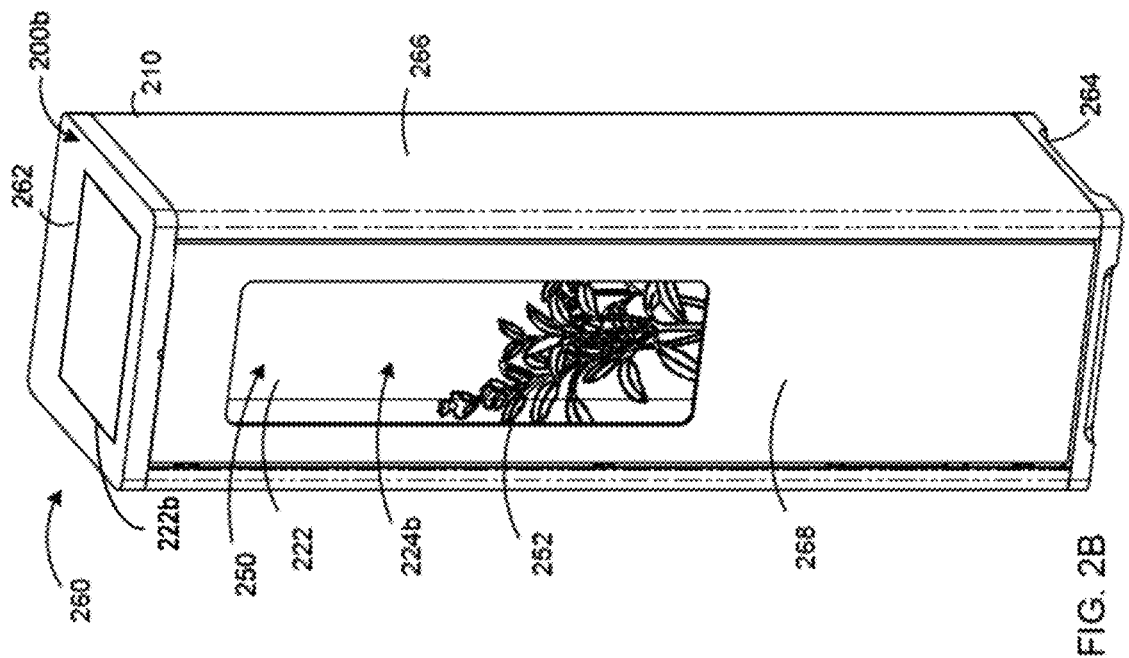
FIG. 2B is the example planter apparatus of FIG. 2A with the transmissivity-reducing window in a substantially transparent state.
Figure 2A:
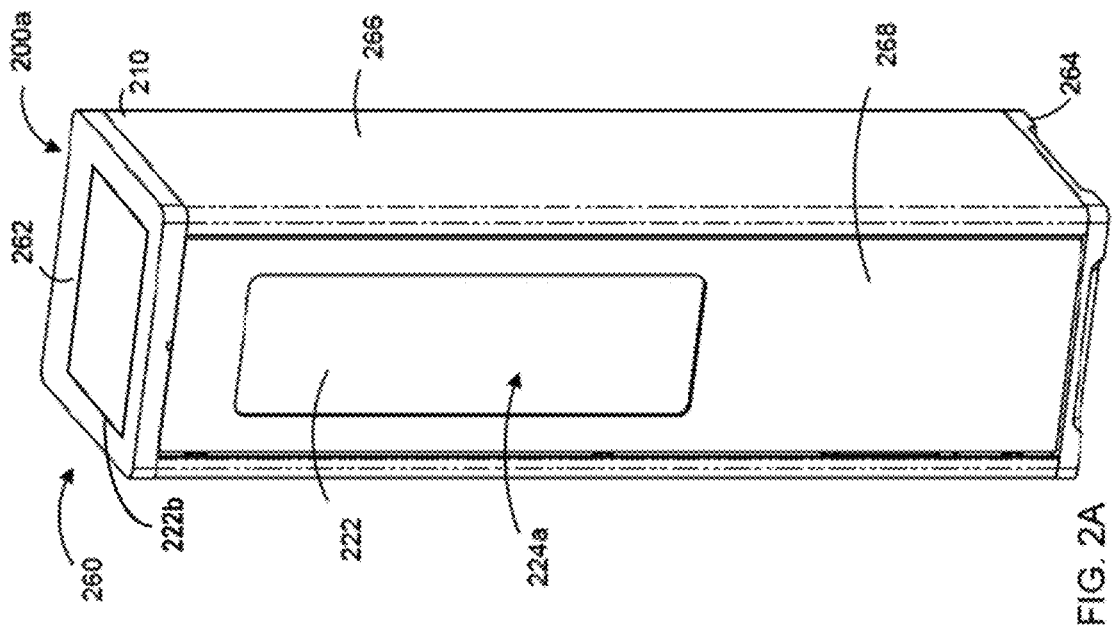
FIG. 2A is an example planter apparatus with a transmissivity-reducing window in a substantially opaque state.

The various embodiments described herein generally relate to a planter apparatus and more specifically, to a planter apparatus with a transmissivity-reducing window. An example planter apparatus is shown in FIGS. 2A and 2B.

The planter apparatus described herein can act as a standalone gardening system and can be automated to provide a plant with the nutrients it needs for growth. For example, the planter apparatus can include an automated light system that provides the plant with the light appropriate for the period within its growth cycle. The planter apparatus can also include an automated nutrient delivery system that is designed to provide the plant with the appropriate nutrients for plant growth. The planter apparatus can include other sensors and filters, such as smell filtration, to facilitate and monitor plant growth while providing the consumer with information on the status of the plant.

Figure 3:
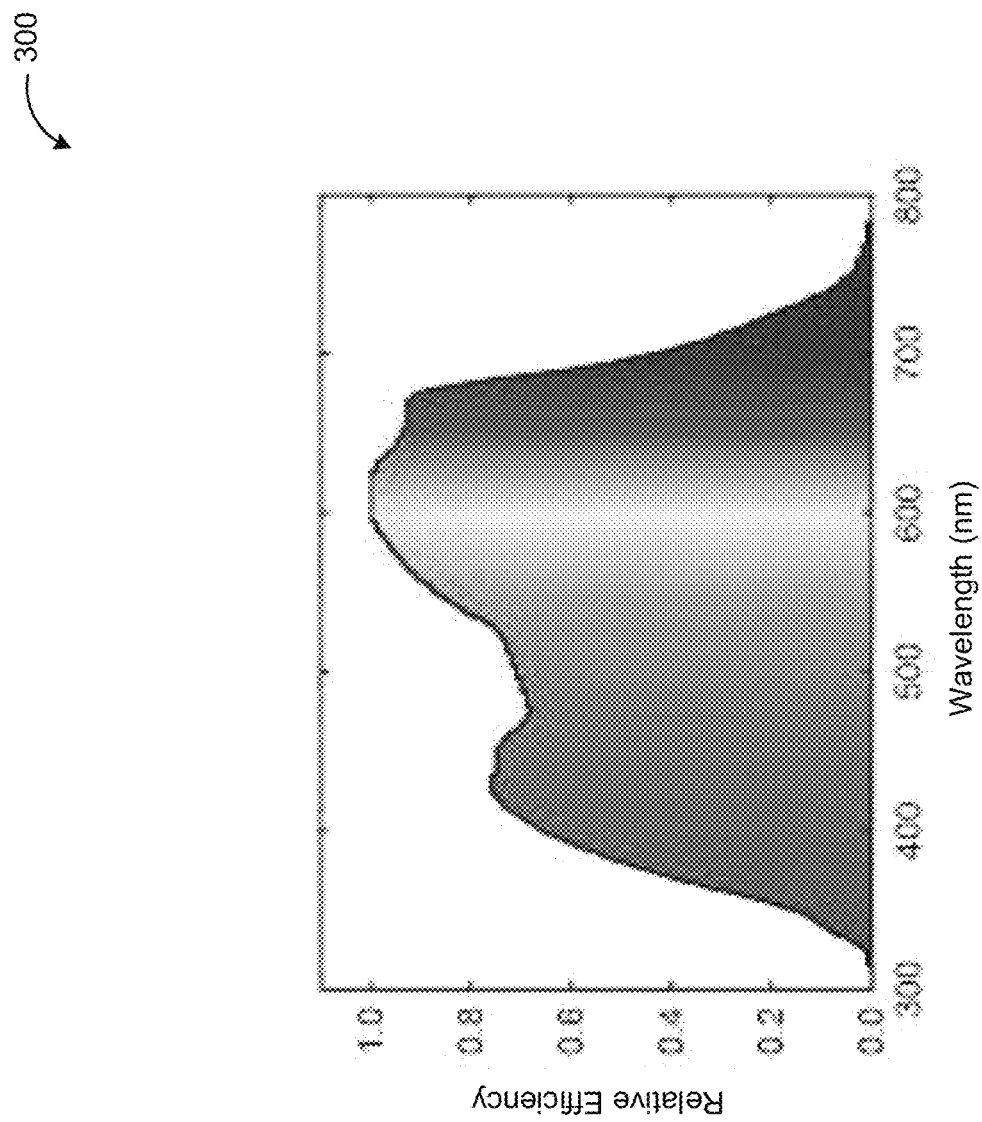
FIG. 3 is a graph of a relative photosynthesis efficiency within a spectral range of 300 nm to 800 nm.

Both the quantity of light and the quality of light received at a plant's light receptors have different biological impacts on the plant. The quality of the light can be evaluated based on the relative photosynthesis efficiency within the light spectrum. FIG. 3 shows an example graph 300 of a relative photosynthesis efficiency within the spectral range of 300 nm to 800 nm.

Photosynthetic active radiation (PAR) refers to the spectral range within the electromagnetic spectrum that can be used for photosynthesis. This spectral range of photosynthetic active radiation is generally between 400 nm to 700 nm, which is approximately the visible light spectrum. Photosynthetic active radiation can be quantified by the unit of measurement, μmol per $m^2$ per second, which is referred to as the photosynthetic photon flux density (PPFD). The photosynthetic photon flux density in plants is analogous to a power distribution at the plant's photon receptacles.

The planter apparatuses described herein are designed to provide the plants with the light suitable for its growth within its growth cycle. For example, the last few weeks of a cannabis plant's growth cycle is the "flowering cycle". During the flowering cycle, the cannabis plant is especially light sensitive and should not be exposed to any more than the light intensity of the moon, or a street lamp quite a distance away.

Photosynthetic active radiation from the external environment can adversely influence the light generated by the planter apparatus. For controlling the plant growth, light from the external environment should be prevented from entering the growth chamber as much as possible. For example, external light can be attenuated so that the growth chamber receives close to no light that is photosynthetic active radiation.

When using the planter apparatus, consumers will likely want to observe the growth of the plant within the growth chamber from time to time. At the same time, when the consumers do not want to be disturbed by the light within the planter apparatus, the transmissivity-reducing window can be controlled to limit any disturbance to the external environment. Although the planter apparatuses described herein require minimal assistance from the consumers, a bond can be fostered between the consumers and the plant when the consumers are able to experience and enjoy the growth of the plant. This can be an important step within the farm-to-table initiative. The planter apparatuses described herein provide consumers with a degree of visual access to the growth chamber without adversely affecting the plant growth. With the transmissivity-reducing window, the consumer can have visual access to the plant without needing to expose the plant to the external environment that could be detrimental to the plant's growth, such as external light and/or bugs and pests. Also, the transmissivity-reducing window disclosed herein can be controlled to contain the light within the planter apparatus in order to maximize the efficiency of the planter apparatus.

Reference is now made to FIG. 1, which is a block diagram 100 of a user device 130 interacting with a planter apparatus 110 via a network 140.

The user device 130 may be any networked device operable to connect to the network 140. A networked device is a device capable of communicating with other devices or systems through a network such as the network 140. A network device may couple to the network 140 through a wired or wireless connection. For example, the user device 130 can include at least a processor and memory, and may be an electronic tablet device, a personal computer, workstation, server, portable computer, mobile device, personal digital assistant, laptop, smart phone, WAP phone, an interactive television, video display terminals, gaming consoles, and portable electronic devices or any combination of these. It should be understood that although only one user device 130 is shown in FIG. 1, more user devices 130 can communicate with the planter apparatus via the network 140. Similarly, although only one planter apparatus 110 is shown in FIG. 1, it should be understood that more than one planter apparatus 110 can be provided.

The network 140 may be any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling communication between the planter apparatus 110 and the user device 130.

Reference will also now be made to FIGS. 2A and 2B, which illustrate generally at 200a and 200b, respectively, an example planter apparatus 210.

As shown in FIG. 1, the planter apparatus 110 includes a planter controller 112, an interface component 114, a storage component 116 and a transmissivity-reducing system 120. Not shown in FIG. 1 is a growth chamber in which a plant is grown within the planter apparatus 110. As will be described, the planter apparatus 210 of FIGS. 2A and 2B shows a growth chamber 250 enclosed by an enclosure 260.

The planter controller 112 controls the operation of the planter apparatus 110. The planter controller 112 may be any suitable processors, controllers or digital signal processors that can provide sufficient processing power depending on the configuration, purposes and requirements of the planter apparatus 110. In some embodiments, the planter apparatus 110 can include more than one processor with each processor being configured to perform different dedicated tasks.

The planter controller 112 can monitor the growth of the plant and can also trigger the operation of a feeding system for the plant. The feeding system provides the plant with the necessary nutrients. The feeding system, for example, can operate a lighting system within the planter apparatus 110 to provide the plant with different light at different points within the growth cycle.

The interface component 114 may be any interface that enables the planter apparatus 110 to communicate with other devices and systems, such as user device 130 via the network 140. In some embodiments, the interface component 114 can include at least one of a serial port, a parallel port or a USB port. The interface component 114 may also include at least one of an Internet, Local Area Network (LAN), Ethernet, Firewire, modem or digital subscriber line connection. Various combinations of these elements may be incorporated within the interface component 114. For example, the interface component 114 may receive input from various input devices, such as a touch screen, a track-pad, a card-reader, voice recognition software and the like depending on the requirements and implementation of the planter apparatus 110.

The storage component 116 can include RAM, ROM, one or more hard drives, one or more flash drives or some other suitable data storage elements such as disk drives, etc. For example, feeding information for the plant can be stored in the storage component 116.

It should be noted that in some embodiments, the planter controller 112, the interface component 114, and the storage component 116 may be combined or may be further separated. The planter controller 112, the interface component 114, and the storage component 116 can be implemented using software, hardware or a combination of software and hardware.

The transmissivity-reducing system 120 includes a transmissivity-reducing window 122 and a transmissivity controller 124.

The transmissivity controller 124 may be any suitable processors, controllers or digital signal processors that can provide sufficient processing power depending on the configuration, purposes and requirements of the transmissivity-reducing system 120. In some embodiments, the transmissivity controller 124 can be operated by the planter controller 112 to adjust the transmissivity of the transmissivity-reducing window 122. In some embodiments, the functionalities of the transmissivity controller 124 can be provided by the planter controller 112.

The transmissivity controller 124 operates to adjust the transmissivity of the transmissivity-reducing window 122. For example, the transmissivity controller 124 can adjust the transmissivity of the transmissivity-reducing window 122 between a substantially opaque state and a substantially transparent state. In some embodiments, the transmissivity controller 124 can adjust the transmissivity of the transmissivity-reducing window 122 between states associated with different levels of transmissivity variability.

When in the substantially opaque state, an observer from outside the planter apparatus 110 cannot clearly see into the growth chamber 250. The transmissivity-reducing window 122 can be translucent or opaque. When a plant is growing inside the growth chamber 250, it is unlikely that the plant can be seen from outside when the transmissivity-reducing window 122 is in the substantially opaque state. In some embodiments, the transmissivity-reducing window 122 blocks a substantial amount of photosynthetic active radiation from entering the growth chamber when in the substantially opaque state.

When in the substantially transparent state, an observer from outside the planter apparatus 110 can see, to an extent, at least a portion of the growth chamber 250. So, when a plant is growing inside the growth chamber 250, the plant can be seen, to an extent, from outside when the transmissivity-reducing window 122 is in the substantially transparent state. In some embodiments, when in the substantially transparent state, the transmissivity-reducing window 122 prevents an amount of photosynthetic active radiation from entering the growth chamber 250. For example, the transmissivity-reducing window can prevent at least 95% of photosynthetic active radiation from entering the growth chamber 250.

The transmissivity controller 124 can adjust the transmissivity in response to a control signal received from the planter controller 112 and/or from the user device 130 via the network 140. For example, a user interface component can be provided at the planter apparatus 110 for receiving input signals from a user. The planter controller 112 can receive an input signal from the user interface component (via the interface component 114) indicating that the transmissivity is to be adjusted, and the planter controller 112 can generate a control signal for triggering the transmissivity controller 124 to adjust the transmissivity. The user interface component can include one or more input components, such as buttons, a touchscreen, and/or other similar user interface components.

For example, a user can operate the user device 130 to adjust the transmissivity of the transmissivity-reducing window 122. In response to a user input indicating that the transmissivity-reducing window 122 should enter a different transmissivity state, such as the substantially opaque state, the user device 130 can generate and transmit the control signal to the transmissivity-reducing system 120 to trigger the transmissivity-reducing window 122 to enter a different state.

The planter controller 112 can also generate the control signal for triggering the transmissivity controller 124 to adjust the transmissivity of the transmissivity-reducing window 122 at different stages of a plant's growth cycle. For example, the planter controller 112 can generate the control signal to trigger the transmissivity-reducing window 122 to enter a substantially transparent state at the stages of the growth cycle in which the plant is not as sensitive to the external environment, and to automatically trigger the transmissivity-reducing window 122 to enter a substantially opaque state at stages of the growth cycle in which the plant is highly sensitive to the external environment.

In some embodiments, the transmissivity controller 124 can prioritize the control signals received from the planter controller 112 over the control signals received from the user device 130. For example, when the plant is highly sensitive to the external environment, the transmissivity controller 124 can prevent the user from adjusting the transmissivity of the transmissivity-reducing window 122.

Figure 4B:
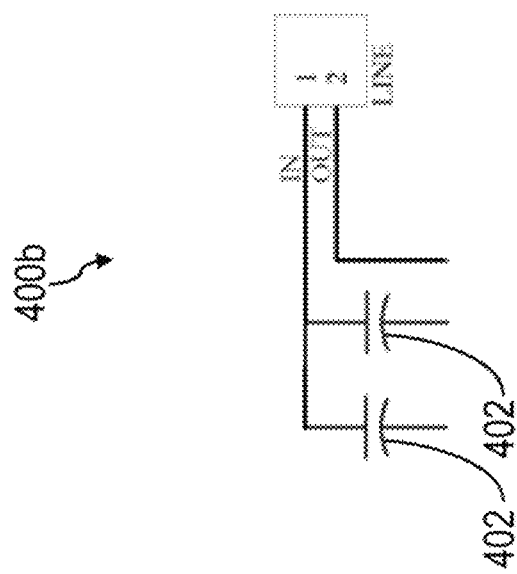
FIG. 4B is an example transmissivity controller in accordance with another example embodiment.

When the transmissivity-reducing window 122 is composed of a switching film, the transmissivity controller 124 operates to generate a control signal for triggering the switching film between the substantially opaque state and the substantially transparent state. The switching film can be formed of electrochromic glass or any display formed of liquid crystal, such as polymer dispersed liquid crystals (PDLCs). FIGS. 4A and 4B show example implementations of the transmissivity controller 124.

FIG. 4A shows an example AC to AC converter 400a. The converter 400a is a step down converter of AC voltage. The amount of AC voltage provided by the converter 400a to the transmissivity-reducing window 122 varies with the size of the switching film. Typically, switching film can be operated by an AC voltage within a range of approximately 14 VAC to 60 VAC.

FIG. 4B shows an example capacitive circuit 400b for driving the switching film. The capacitive circuit 400b can be appropriate for switching film that is of a smaller size. In some embodiments, the capacitive circuit 400b can include a series of capacitors 402 connected in parallel. The capacitive circuit 400b will vary depending on the load value of the current required to power the switching film.

Referring back to FIG. 4A, another example embodiment, the transmissivity controller 124 can include a DC to AC converter 400c. For example, the DC to AC converter 400c can convert 12 VDC to 60 VAC. In another example embodiment, the transmissivity controller 124 can include digital to analog converters.

It will be understood that the examples of the transmissivity controller 124 shown in FIGS. 4A and 4B are only for illustrative purposes and are not limitations. For example, in some embodiments, the transmissivity controller 124 can include a direct current source for driving the switching film.

FIG. 2A shows the planter apparatus 210 with a transmissivity-reducing window 222 and an enclosure 260. It will be understood that the shown enclosure 260 and transmissivity-reducing window 222 are illustrated herein as examples and do not limit the disclosed embodiments.

The enclosure 260 encloses the growth chamber 250. The enclosure 260 for the planter apparatus 210 includes a top surface 262, a bottom surface 264 and side walls 266, 268 that extend from the top surface 262 to the bottom surface 264. The side wall 268 also acts as a door that can be opened to access the growth chamber 250. The transmissivity-reducing window 222 is also mounted to the side wall 268.

In other embodiments, the transmissivity-reducing window 222b can be mounted to other surfaces, such as the top surface 262. Additional transmissivity-reducing windows 222, 222b can also be mounted to the other surfaces 262, 264, and 266.

In FIG. 2A, the transmissivity-reducing window 222 is in a substantially opaque state, as shown generally at 224A. In FIG. 2B, the transmissivity-reducing window 222 is in a substantially transparent state, as shown generally at 224B (FIG. 2B). In the substantially opaque state 224A, the transmissivity-reducing window 222 prevents nearly all light from the external environment from entering the growth chamber 250. In the substantially transparent state 224B, a substantial amount of photosynthetic active radiation is prevented from entering the growth chamber 250 but at least a portion of the growth chamber 250 is viewable through the transmissivity-reducing window 222. As shown in FIG. 2B, a plant 252 can be seen through the transmissivity-reducing window 222.

In some embodiments, the visibility of the growth chamber 250 can be determined from the photosynthetic photon flux density measured within the growth chamber 250.

Figure 12:
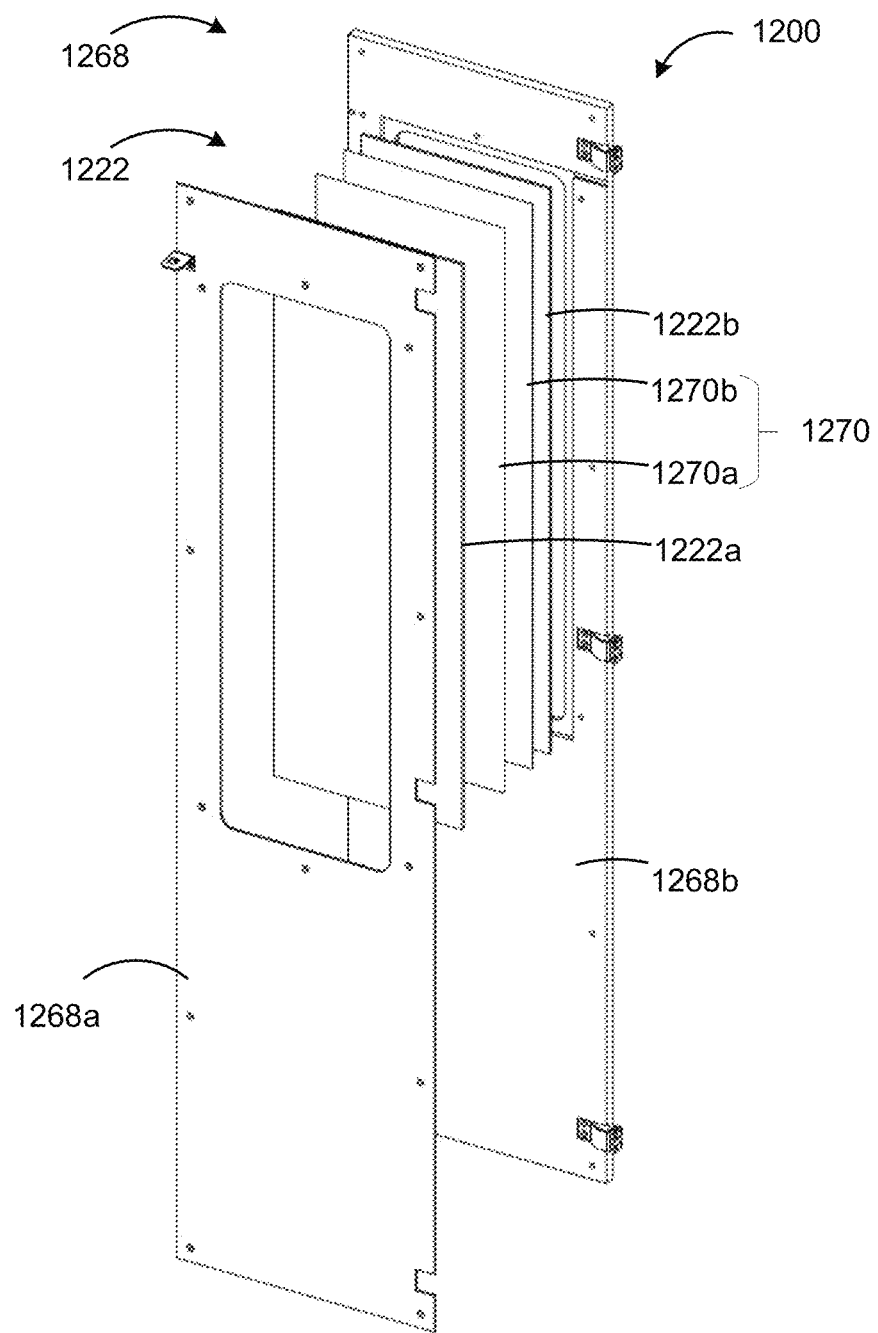
FIG. 12 is an exploded view of an example side wall of the planter apparatus of FIG. 2A.

The transmissivity-reducing window 222 can be formed of one or more transmissivity-reducing layers. For example, FIG. 12 is an exploded view of an example side wall 1268. As shown in FIG. 12, the transmissivity-reducing window 1222 is mounted to the side wall 1268. In this example, the side wall 1268 also acts as a door for the planter apparatus 210. The side wall 1268 has a first wall face 1268a and a second wall face 1268b. The transmissivity-reducing window 1222 includes a first window layer 1222a and a second window layer 1222b. Coupled between the first and second window layers 1222a, 1222b is the transmissivity-reducing material 1270, which, in this example, includes a first transmissivity-reducing layer 1270a and a second transmissivity-reducing layer 1270b coupled to the first transmissivity-reducing layer 1270a. The first transmissivity-reducing layer 1270a and the second transmissivity-reducing layer 1270b can be coupled together with the sandwich effect by the first and second window layers 1222a, 1222b. In some embodiments, the transmissivity-reducing material 1270 can include one transmissivity-reducing layer.

Figure 13A:
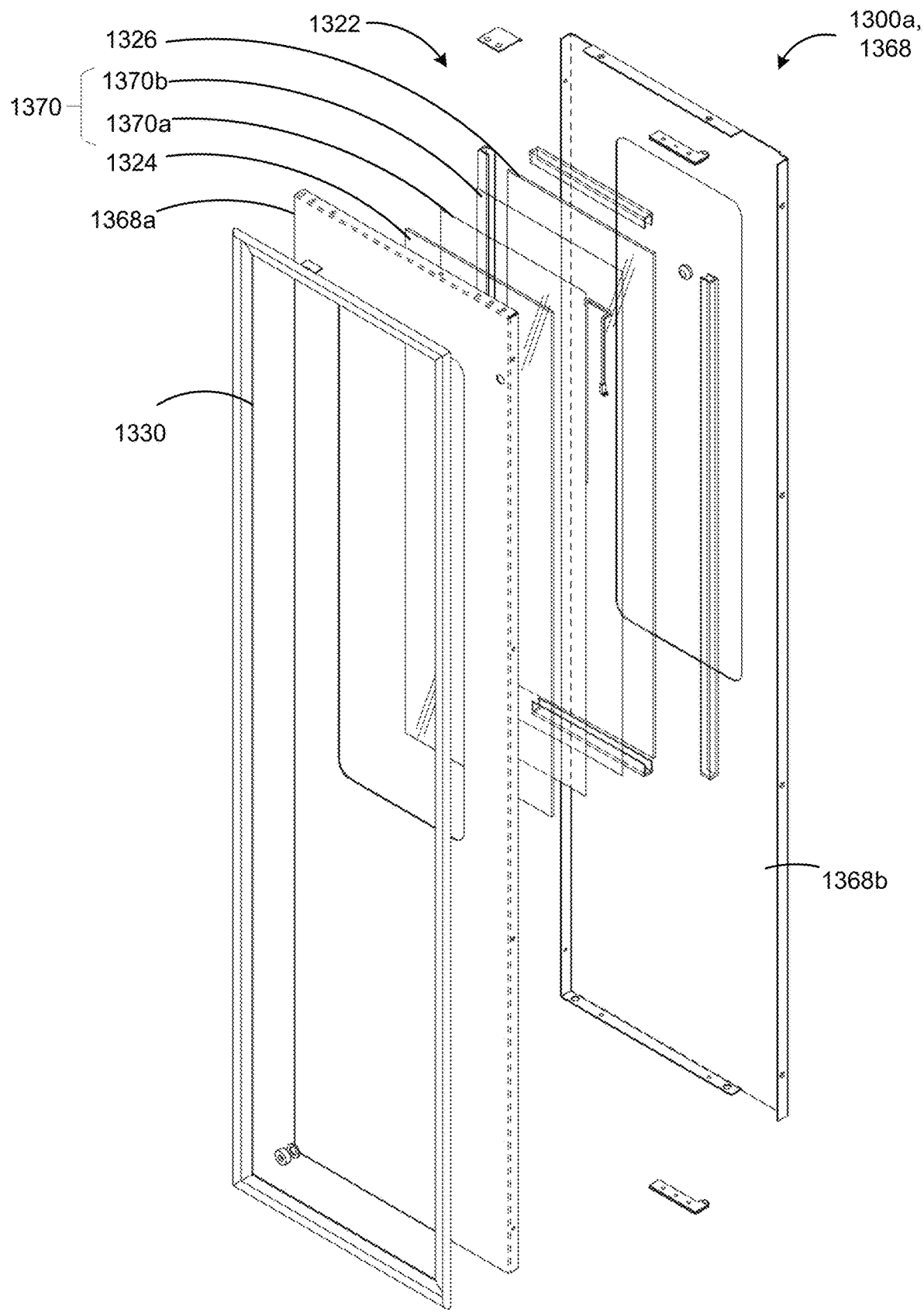
FIG. 13A is an exploded view of another example side wall of the planter apparatus of FIG. 2A.
Figure 13B:
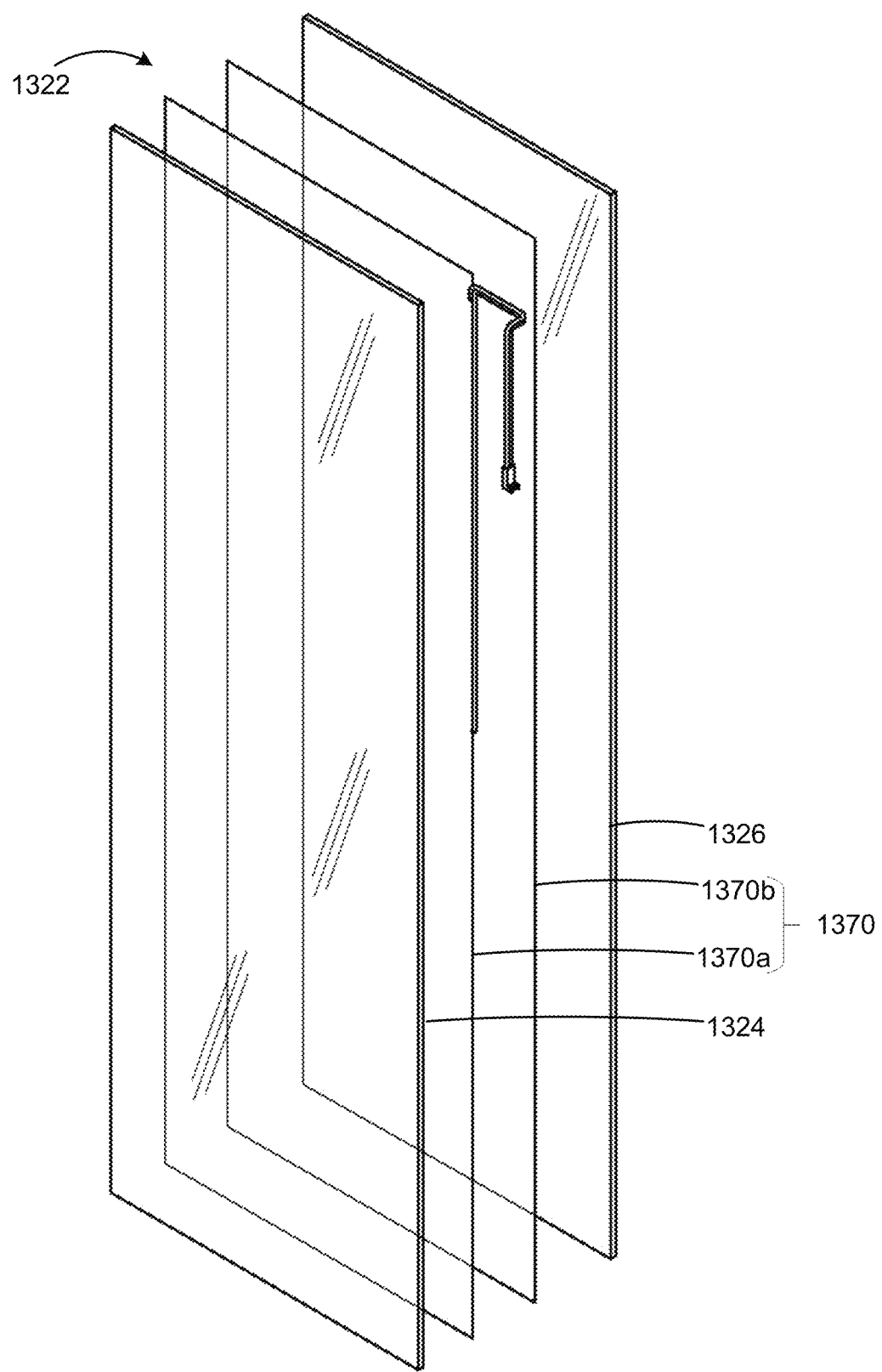
FIG. 13B is an exploded view of the example window of FIG. 13A.

Another example side wall 1368 is shown in an exploded view 1300a in FIG. 13A. FIG. 13B is an exploded view of the window 1322 in FIG. 13A.

The side wall 1368 has a first wall face 1368a and a second wall face 1368b. The transmissivity-reducing window 1322 includes a window layer 1324 and a semi-transparent mirror layer 1326. Coupled between the window layer 1324 and the mirror layer 1326 is the transmissivity-reducing material 1370, which can include a first transmissivity-reducing layer 1370a and a second transmissivity-reducing layer 1370b coupled to the first transmissivity-reducing layer 1370a. In some embodiments, the transmissivity-reducing material 1370 can include one transmissivity-reducing layer.

The first transmissivity-reducing layer 1370a and the second transmissivity-reducing layer 1370b can be coupled together with the sandwich effect by the window layer 1324 and the mirror layer 1326.

The mirror layer 1326, such as a semi-transparent mirror, can limit viewing to one direction. That is, the mirror layer 136 can limit the direction of view to pass from a side of the mirror layer 1326 that is darker to a side of the mirror layer 1326 that is brighter. A semi-transparent mirror can be created by applying a layer of reflective material, such as aluminum or silver-chloride, to a transparent medium, such as glass or acrylic. Example semi-transparent mirrors include a one-way mirror and a two-way mirror.

The first and second transmissivity-reducing layers can be formed of various materials, such as, but not limited to, PDLCs, electrochromic glass, polarized glass, switching films, gel filters, liquid crystal devices (LCDs), dichroic material, photochromic material, guest host displays, suspended particle, privacy film, and a semi-transparent mirror.

A majority of these materials operate based on the electrochromic glass and PDLCs technologies. For example, switching films can be formed of electrochromic glass or PDLCs. FIG. 5 is a comparative table 500 of the characteristics of some of these devices. A brief description of these devices is now provided.

Electrochromic glass enters a substantially opaque state in response to an application of voltage. The transition is slow. Without further application of the voltage, the electrochromic glass will return to its natural translucent state. In comparison with a medium formed of PDLC, polarized filters and gel filters, electrochromic glass is rather difficult to install, fairly expensive and is rather poor at blocking specific light and overall light.

PDLCs are a combination of the liquid crystal and polymer technologies. PDLCs have a relatively fast switching time. When an electric charge is applied across the medium formed of the PDLC, the liquid crystals align in a parallel manner and perpendicular to the direction of light travelling through the medium. Light can, thus, pass freely through the PDLC medium, which appears substantially transparent. When the electric charge is removed, the liquid crystals scatter and block a majority of the light so that the PDLC medium appears substantially opaque. To prevent the liquid crystals from becoming polarized in one direction after elongated exposure to an electric field, PDLCs typically operate on alternating current. In comparison with a medium formed of electrochromic glass, polarized filters and gel filters, PDLCs are fairly easy to install, are fairly inexpensive, block light fairly well, and offer fairly high visibility in the substantially transparent state.

A polarizer filter allows specific polarizations of light to pass and blocks light waves of other polarizations. In comparison with a medium formed of electrochromic glass, PDLCs and gel filters, polarized filters are very effective at blocking light and have very high visibility when in the substantially transparent state. However, polarizer filters are very expensive and difficult to install in comparison.

Example polarizers include a linear polarizer and a circular polarizer. In an example linear polarizer, light with a polarization that is perpendicular to the linear polarizer's polarization passes through. An example circular polarizer can operate based on a two-panel polarization method. The first panel, such as a quarter-wave plate, polarizes the incident light in a specific direction. The second panel is a linear polarizer that allows a specific polarized light to pass or not pass. By physically shifting the second panel with respect to the first panel, specific regions of the visible light spectrum can be allowed to pass or not pass.

Figure 6:
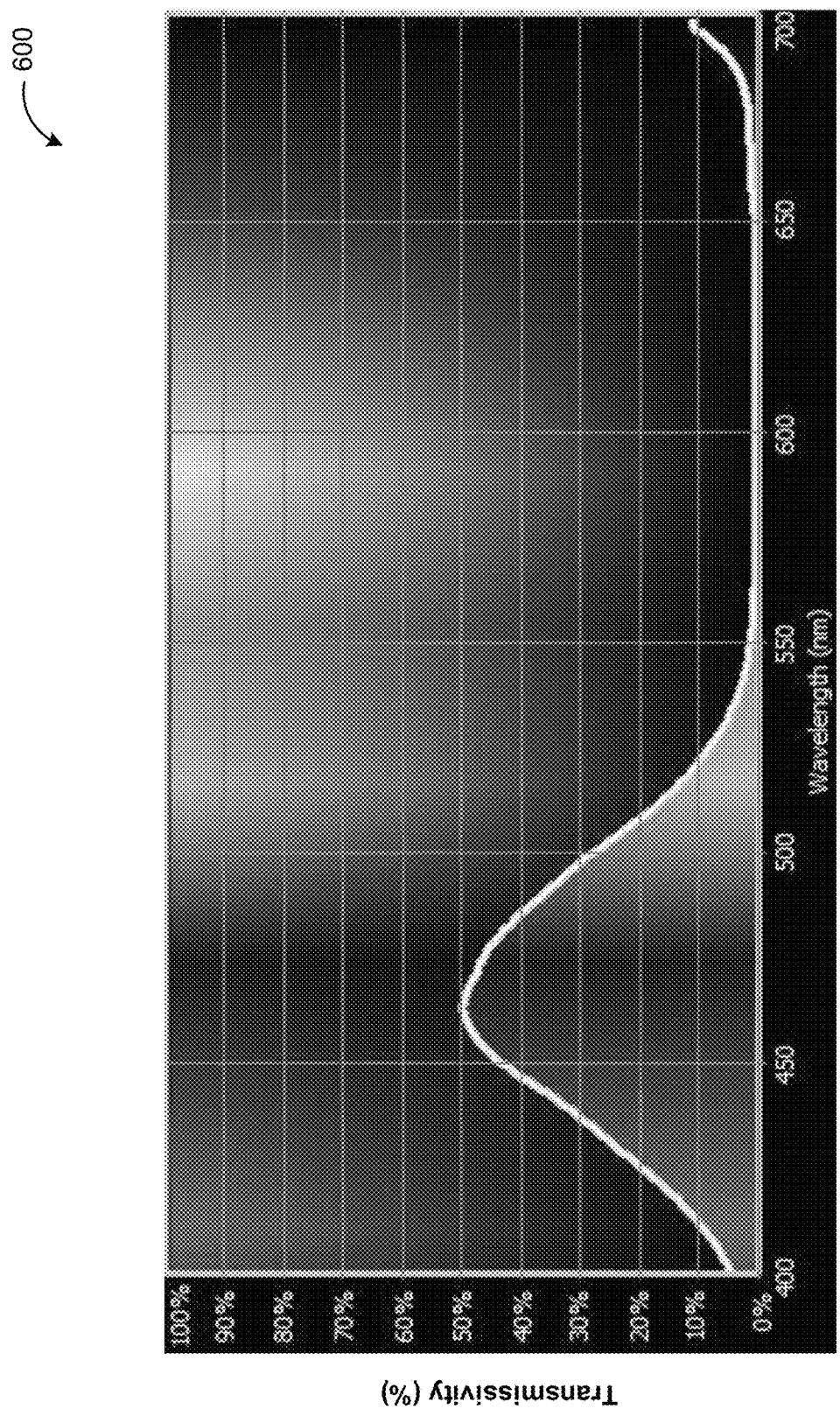
FIG. 6 is a graph of an example transmissivity of a dark blue gel filter in accordance with an example embodiment.

Gel filters are typically formed from sheets of polycarbonate or polyester. Gel filters tend to fade over time during elongated use and especially when acting as lower wavelength blockers, such as when blocking blue light. Gel filters act like a bandpass filter for the visible colour they represent. For example, as shown in the graph 600 of FIG. 6, a dark blue gel filter allows light at the dark blue wavelength (approximately 460 nm) to pass nearly unaffected but attenuates light of other wavelengths to a varying degree. In comparison with a medium formed of electrochromic glass, PDLCs and polarized filters, gel filters are fairly effective at blocking specific light, easy to install and fairly inexpensive. Gel filters offer relatively good visibility.

One way mirrors, or semi-transparent mirrors, exhibit characteristics similar to that of gel filters and PDLCs. Semi-transparent mirrors limit the direction of view to pass from one side of the mirror that is darker to the other side of the mirror that is brighter. When the environment at one side of the semi-transparent mirror becomes more illuminated than the environment at the other side, the reflection from the brighter side of the semi-transparent mirror masks the darker side so that the direction of view from the brighter side is less visible.

Various experiments were conducted to better understand the characteristics of the described materials for use with the planter apparatus 110. Reference will now be made to FIGS. 7A to 11.

The experiments were conducted with Gigahertz-Optik™'s MSC15 device, which is a light meter for measuring photosynthetic active radiation. The light meter was placed into a box with an open top to mimic the planter apparatus 110 environment as much as possible. The light meter was placed approximately where a plant would be within the growth chamber 250. The light meter can collect measurements at predefined intervals, such as an average of 10 seconds.

FIGS. 7A and 7B are tables 700a and 700b, respectively, of experimental values of a transmissivity of light from an example T5 light source and an example red/blue (R/B) LED strip light source with the use of the materials under test.

The T5 light source is a standard fluorescent lighting device and is in the shape of a short tube. The T5 light source and the R/B LED strip light source are typical sources of photosynthetic active radiation within the indoor environment. The transmissivity of light values were collected at three different distances (0.1 m, 0.5 m and 1 m) from the light meter.

Figure 10:
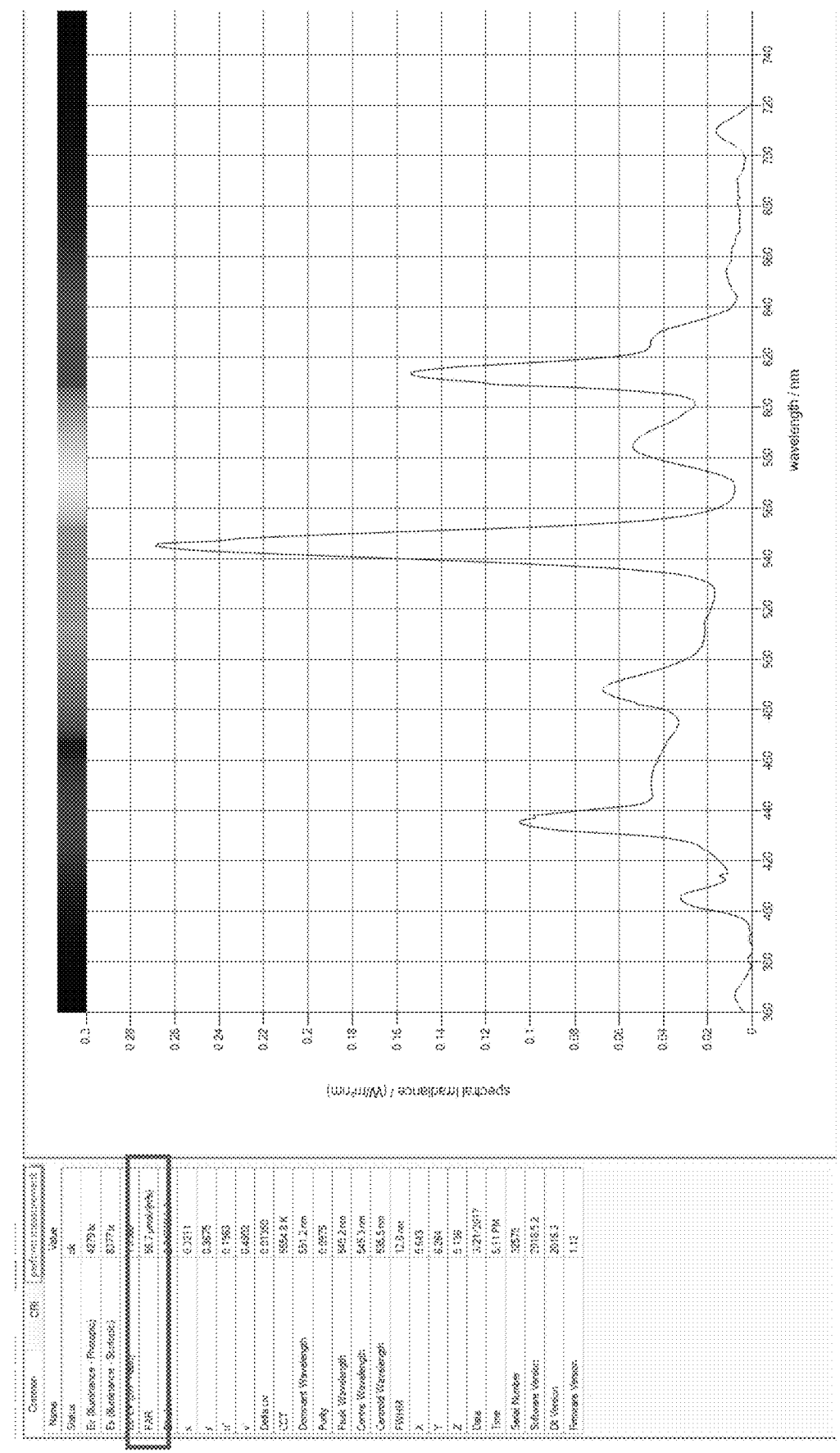
FIG. 10 is a graph of detected photosynthetic active radiation in accordance with an example embodiment.

The experiments conducted herein include a case when no transmissivity-reducing material is used in order to provide a reference for visibility of the growth chamber 250. FIG. 10 is a graph 1000 of the detected photosynthetic active radiation by the light meter when the T5 light source was at 0.1 m with no transmissivity-reducing material. The light meter measured an average of 55.020 µmol/($m^2$s), as shown in FIG. 7A.

Figure 11:
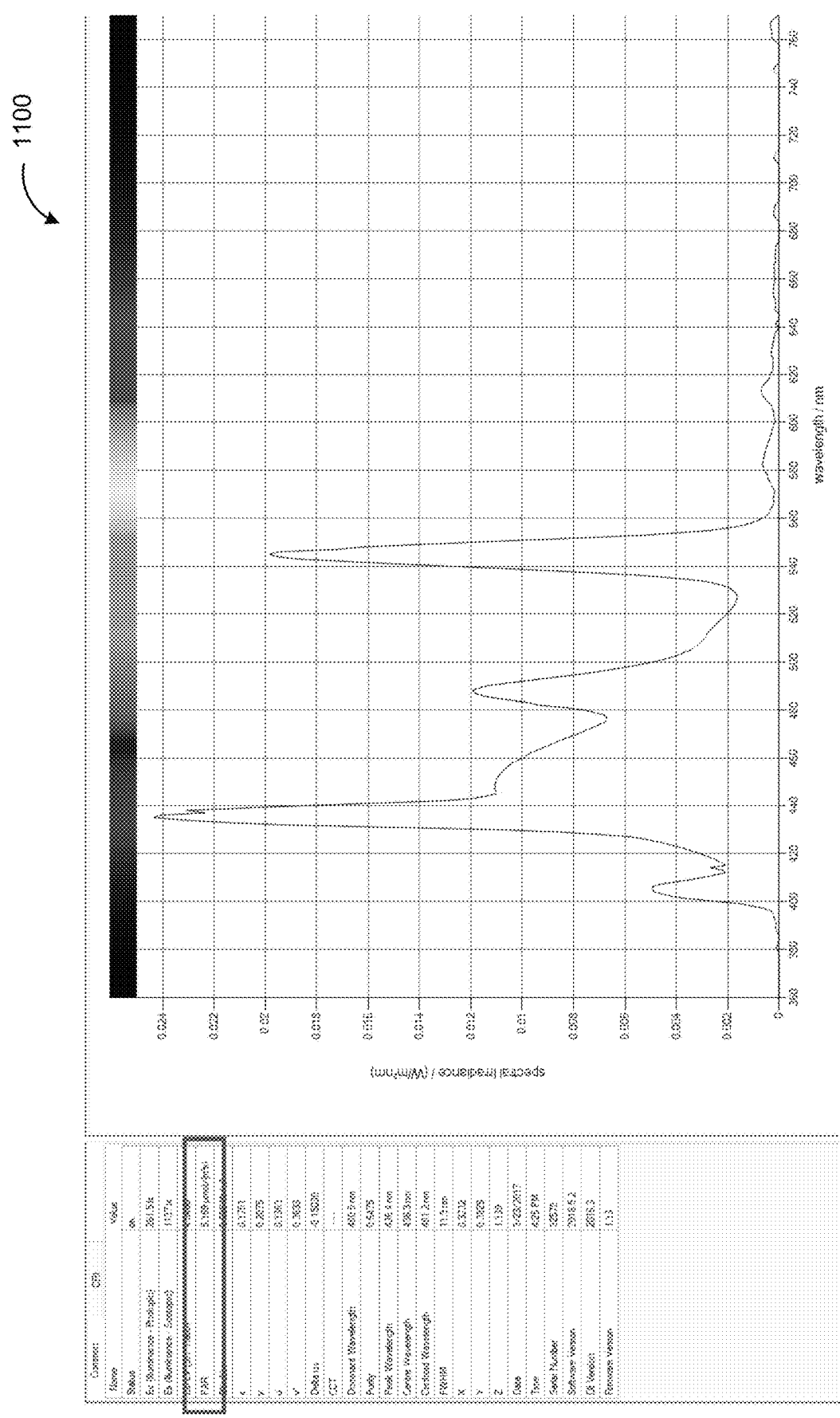
FIG. 11 is a graph of detected photosynthetic active radiation in accordance with another example embodiment.

FIG. 11 is a graph 1100 of the detected photosynthetic active radiation by the light meter when the T5 light source was at a distance of 0.1 m and when a blue gel filter and a red switching film are used. The light meter measured an average of 4.896 µmol/($m^2$s), as shown in FIG. 7B.

FIG. 14 is a table 1400 with experimental values of a transmissivity of light from different example light sources with the use of no filter and the use of a combination of a red switching film, a blue gel filter and a semi-transparent mirror.

Figure 8A:
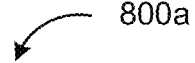

FIGS. 8A and 8B are tables 800a and 800b, respectively, of experimental values of an amount of reduction of light from the T5 light source and the red/blue (R/B) LED strip light source with the use of some example materials under test. The transmissivity of light values were collected at three different distances (0.1 m, 0.5 m and 1 m) from the light meter.

From the experimental values in FIGS. 8A and 8B, it can be seen that use of a material formed of a combination of a switching film and a gel filter substantially reduces the amount photosynthetic active radiation in comparison with a single layer of either the gel filter or the switching film. The use of the red gel filter and blue gel filter, for example, reduces an average of 98.59% of photosynthetic active radiation for both the T5 light source and the R/B LED strip light source (FIG. 8B). When using a switching film with a gel filter, the use of a red switching film and a blue gel filter reduces an average of 92.50% of photosynthetic active radiation for both the T5 light source and the R/B LED strip light source (FIG. 8B), and the use of a blue switching film and red gel filter reduces an average of 94.22% of photosynthetic active radiation for the T5 light source (FIG. 8B). In another example (FIG. 8B), the use of a red switching film, a blue gel film and a semi-transparent mirror reduces an average of 99.49% with the T5 light source and the R/B LED strip light source. FIG. 15 is a table 1500 with experimental results from the light sources used in FIG. 14. As shown in FIG. 15, the combination of a red switching film, a blue gel filter and a semi-transparent mirror can reduce an average of 99.79% with a light setting of 50% blue, 50% red and 75% white, and 0% blue, 100% red and 100% white.

FIG. 9 is a table 900 of visibility ratings assigned to the various materials under test at different light environments.

For the results of FIG. 9, a red/blue/white LED light source was used and set at different settings depending on the type of material being tested. The visibility ratings were assigned for different distances (1 m, 3 m and 5 m) from the light meter. The visibility ratings were assigned based on an observer's ability to view at least a portion of the region inside the testing area. The visibility ratings range from 1 to 5 with 5 being the highest visibility.

From FIG. 9, it can be seen that a layer of blue switching film received the highest overall visibility rating of 4.7 at a light setting of 50% blue, 100% red and 100% white.

When a switching film is used with a gel filter, FIG. 9 shows that a combination of a red switching film and a blue gel filter was assigned the highest visibility rating of 3.3 at a light setting of 0% blue, 100% red and 100% white. A visibility rating of 3.3 represents a fairly good degree of visibility. A combination of a green gel filter and a blue switching film was assigned a visibility rating of 2.7 at a light setting of 75% blue, 100% red and 100% white, and a combination of a red gel filter and a blue switching film was assigned a visibility rating of 2.7. A visibility rating of 2.7 represents a fair degree of visibility. A combination of a red switching film, a blue gel film and a semi-transparent mirror was assigned a visibility rating of 2.0 at a light setting of 50% blue, 75% red and 50% white, and assigned a visibility rating of 2.7 at a light setting of 0% blue, 100% red and 100% white.

Referring again to FIGS. 2A and 2B. The plant 252 growing inside the growth chamber 250 is substantially visible when the transmissivity-reducing window 222 is in the substantially transparent state 224B (FIG. 2B) but photosynthetic active radiation is substantially prevented from entering the growth chamber 250. For example, in the substantially transparent state, the transmissivity-reducing window 222 can prevent at least 95% of photosynthetic active radiation from the external environment from entering the growth chamber 250.

The transmissivity-reducing window 222 can be formed of one or more transmissivity-reducing layers. For example, the transmissivity-reducing window 222 can be formed of a transmissivity-reducing layer or two transmissivity-reducing layers.

When the transmissivity-reducing window 222 is formed of a transmissivity-reducing layer, the transmissivity-reducing layer can be a switching film, a gel filter, or a semi-transparent mirror. From FIG. 8A, it can be seen that a red gel filter can reduce an average of 80.05% of photosynthetic active radiation from the T5 source, whereas a blue gel filter can reduce an average of 84.32% of photosynthetic active radiation from the R/B LED strip light source.

In some embodiments, the transmissivity-reducing window 222 is formed of a first transmissivity-reducing layer and a second transmissivity-reducing layer. The first and second transmissivity-reducing layers can be formed of a gel filter or a switching film, or one of the first and second transmissivity-reducing layers is a gel filter and the other a switching film.

When the transmissivity-reducing layers are formed of the gel filter, the transmissivity controller 124 is not needed to trigger the reduction of transmissivity. The gel filters, as described, will block the colour for which they represent.

The gel filter may be a red, blue or green gel filter. The switching film may be a red switching film or a blue switching film.

In some embodiments, the first transmissivity-reducing layer can be formed of a blue switching film and the second transmissivity-reducing layer can be formed of a green gel filter. In some embodiments, the first transmissivity-reducing layer can be formed of a blue switching film and the second transmissivity-reducing layer can be formed of a red gel filter. In some embodiments, the first transmissivity-reducing layer can be formed of a blue gel filter and the second transmissivity-reducing layer can be formed of a red gel filter.

In some embodiments, the transmissivity-reducing window 222 can include more than two layers. For example, the transmissivity-reducing window 222 can include a first transmissivity-reducing layer formed of PDLC, a second transmissivity-reducing layer formed of a gel filter and a third transmissivity-reducing layer formed of a semi-transparent mirror.

It will be appreciated that numerous specific details are described in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that the term "coupled" used herein indicates that two elements can be directly coupled to one another or coupled to one another through one or more intermediate elements.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Various embodiments have been described herein by way of example only. Various modification and variations may be made to these example embodiments without departing from the spirit and scope of the invention, which is limited only by the appended claims.

What is claimed is:

1. A planter apparatus comprising:
    a growth chamber;
    a transmissivity-reducing window adjustable from a substantially opaque state to a substantially transparent state, wherein the transmissivity-reducing window comprises:
        a first transmissivity-reducing layer and
        a second transmissivity-reducing layer coupled to the first transmissivity-reducing layer,
        wherein, in the substantially transparent state, the transmissivity-reducing window blocks environmental photosynthetic active radiation from the growth chamber to protect light-sensitive plants while allowing at least a portion of the growth chamber to be viewable through the transmissivity-reducing window; and
    a transmissivity controller for operating the transmissivity-reducing window between the substantially opaque state and the substantially transparent state.

2. The planter apparatus of claim 1, wherein in the substantially transparent state, the transmissivity-reducing window prevents at least 95% of photosynthetic active radiation from entering the growth chamber.

3. The planter apparatus of claim 1, wherein the first transmissivity-reducing layer comprises a switching film and the second transmissivity-reducing layer comprises one of a semi-transparent mirror layer and a filtering layer.

4. The planter apparatus of claim 1, wherein the transmissivity-reducing window comprises an exterior layer and an interior layer, the first and second transmissivity-reducing layers being coupled between the exterior layer and the interior layer, the exterior layer comprising a window layer and the interior layer comprising a semi-transparent mirror layer.

5. The planter apparatus of claim 1, wherein each of the first transmissivity-reducing layer and the second transmissivity-reducing layer comprises a switching film.

6. The planter apparatus of claim 5, wherein the switching film comprises one of a red switching film and a blue switching film.

7. The planter apparatus of claim 1, wherein the first transmissivity-reducing layer comprises a switching film and the second transmissivity-reducing layer comprises a gel filter.

8. The planter apparatus of claim 7, wherein the switching film comprises a red switching film.

9. The planter apparatus of claim 7, wherein the switching film comprises a blue switching film.

10. The planter apparatus of claim 7, wherein the gel filter comprises a blue gel filter.

11. The planter apparatus of claim 7, wherein the switching film comprises a material selected from the group consisting of electrochromic glass and polymer dispersed liquid crystals (PDLC).

12. The planter apparatus claim 7, wherein the transmissivity controller generates a control signal to trigger the switching film to enter one of the substantially opaque state and the substantially transparent state.

13. The planter apparatus of claim 12, wherein the transmissivity controller comprises an AC to AC converter to generate the control signal.

14. The planter apparatus of claim 12, wherein the transmissivity controller comprises a DC to AC converter to generate the control signal.

15. The planter apparatus of claim 12, wherein the control signal comprises an alternating current signal in an approximate range from 14 VAC to 60 VAC.

16. The planter apparatus of claim 12, wherein the transmissivity controller comprises a plurality of capacitors connected in parallel to generate the control signal.

17. The planter apparatus of claim 1 comprises an enclosure for enclosing the growth chamber, the enclosure comprising:
    a top surface;
    a bottom surface; and
    one or more side walls extending from the top surface to the bottom surface.

18. The planter apparatus of claim 17, wherein the transmissivity-reducing window is mounted to a side wall of the one or more side walls.

19. The planter apparatus of claim 17, wherein the transmissivity-reducing window comprises a first window and a second window, and the first window is mounted to the one or more side walls and the second window is mounted to the top surface.

20. The planter apparatus of claim 17, wherein the one or more side walls comprise a door for providing access to the growth chamber.

* * * * *